US009154454B1

(12) United States Patent  (10) Patent No.: US 9,154,454 B1
Kumar et al.  (45) Date of Patent: Oct. 6, 2015

(54) FABRIC LINK PHYSICAL CODING SUBLAYER PACKING SCHEME

(71) Applicant: Cisco Technology, Inc., San Jose, CA (US)

(72) Inventors: Lalit Kumar, Fremont, CA (US); Deepak Mayya, Fremont, CA (US); Simon Hsu, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 160 days.

(21) Appl. No.: 13/828,095

(22) Filed: Mar. 14, 2013

(51) Int. Cl.
  *H04L 12/861* (2013.01)
  *H04L 12/931* (2013.01)
  *H04L 12/54* (2013.01)

(52) U.S. Cl.
  CPC ............ *H04L 49/9057* (2013.01); *H04L 49/00* (2013.01); *H04L 49/90* (2013.01); *H04L 12/56* (2013.01)

(58) Field of Classification Search
  USPC .................. 370/389, 412, 353, 474, 356, 351
  See application file for complete search history.

(56) References Cited

U.S. PATENT DOCUMENTS

| | | | |
|---|---|---|---|
| 7,835,276 B2 | 11/2010 | Naik et al. | |
| 8,009,667 B1* | 8/2011 | Stanwood et al. | 370/389 |
| 2005/0243849 A1* | 11/2005 | Wentink | 370/412 |
| 2007/0091886 A1* | 4/2007 | Davis et al. | 370/389 |
| 2009/0010362 A1* | 1/2009 | Thaler | 375/340 |
| 2013/0003725 A1 | 1/2013 | Hendel et al. | |
| 2014/0146835 A1* | 5/2014 | Hoyer et al. | 370/474 |

OTHER PUBLICATIONS

Nicholl et al., A physical coding sublayer for 100 GbE, Communications Magazine, IEEE (vol. 45 , Issue: 12 ), pp. 4-10.*

* cited by examiner

*Primary Examiner* — Habte Mered
*Assistant Examiner* — Rownak Islam
(74) *Attorney, Agent, or Firm* — Edell, Shapiro & Finnan, LLC

(57) ABSTRACT

Techniques are provided to allow for efficient data packing under certain coding schemes, e.g., when an enhanced 64/66 encoding scheme is employed. The traditional 64/66 encoding scheme uses idle bytes to pad packets to obtain a packet of fixed size, thereby adding idle overhead to transmitted packets. Accordingly, the techniques eliminate padding bytes and provide for receiving packets by way of a first data link at forwarding device. The packets are transmitted using a scheme that pads the packets to achieve a predetermined packet length. The padding is removed from the received packets to obtain unpadded packets. Data segments of the unpadded packets are concatenated for forwarding in a continuous data stream with a packet delimiter separating each of the unpadded packets. The continuous data stream is encoded using enhanced physical coding sub layer for forwarding over a second data link.

18 Claims, 13 Drawing Sheets

| DATA BLOCK FORMAT | SYNC BITS | BLOCK PAYLOAD | DESCRIPTION |
|---|---|---|---|
| D0 D1 D2 D3 D4 D5 D6 D7 | 01 | D0 D1 D2 D3 D4 D5 D6 D7 | DATA BLOCK |
| CONTROL BLOCK FORMAT | SYNC BITS | BLOCK TYPE | |
| 00 D1 D2 D3 D4 D5 D6 D7 | 10 | 0X4b D1 D2 D3 D4 D5 D6 D7 | CONTROL SOP ALIGNED TO 64 BITS: ACK/DROP/RETRANSMIT/PROBE |
| S0 D1 D2 D3 D4 D5 D6 D7 | 10 | 0X78 D1 D2 D3 D4 D5 D6 D7 | UNICAST SOP ALIGNED TO 64 BITS |
| 01 D1 D2 D3 S4 D5 D6 D7 | 10 | 0X68 D1 D2 D3 S4 D5 D6 D7 | MULTICAST SOP ALIGNED TO 64 BITS |
| T0/S0 D1 D2 D3 D4 D5 D6 D7 | 10 | 0X87 (T0/S0) D1 D2 D3 D4 D5 D6 D7 | EOT/SOT IN BYTE 0 |
| D0 T1/S1 D2 D3 D4 D5 D6 D7 | 10 | 0X99 T1/S1 D2 D3 D4 D5 D6 D7 | EOT/SOT IN BYTE 1 |
| D0 D1 T2/S2 D3 D4 D5 D6 D7 | 10 | 0X22 D1 T2/S2 D3 D4 D5 D6 D7 | EOT/SOT IN BYTE 2 |
| D0 D1 D2 T3/S3 D4 D5 D6 D7 | 10 | 0Xb4 D1 D2 T3/S3 D4 D5 D6 D7 | EOT/SOT IN BYTE 3 |
| D0 D1 D2 D3 T4/S4 D5 D6 D7 | 10 | 0X00 D1 D2 D3 T4/S4 D5 D6 D7 | EOT/SOT IN BYTE 4 |
| D0 D1 D2 D3 D4 T5/S5 D6 D7 | 10 | 0Xd2 D1 D2 D3 D4 T5/S5 D6 D7 | EOT/SOT IN BYTE 5 |
| D0 D1 D2 D3 D4 D5 T6/S6 D7 | 10 | 0Xe1 D1 D2 D3 D4 D5 T6/S6 D7 | EOT/SOT IN BYTE 6 |
| D0 D1 D2 D3 D4 D5 D6 T7/S7 | 10 | 0Xf1 D1 D2 D3 D4 D5 D6 T7/S7 | EOT/SOT IN BYTE 7 |
| C0 D1 T2 T3 T4 T5 T6 T7 | 10 | 0X2d T1 T2 T3 T4 T5 T6 SIZE | EOP, SIZE, EOP IN BYTE 0 TO 6 DETERMINED BY SIZE |
| C0 D1 D2 D3 D4 D5 D6 T7 | 10 | 0X33 T1 T2 T3 T4 T5 T6 EOP | EOP IN BYTE 7 |
| C0 D1 D2 D3 D4 D5 D6 D7 | 10 | 0X66 00 00 00 99 D5 D6 D7 | FLOW CONTROL MESSAGES |
| 00 D1 D2 D3 D4 D5 D6 D7 | 10 | 0X66 00 00 00 87 D5 D6 D7 | POWER SAVING CONTROL CODES: 0X87 POWER DOWN, |
| | | 0X66 00 00 00 78 D5 D6 D7 | 0X78 POWER UP |
| 00 D1 D2 D3 D4 D5 D6 D7 | 10 | 0X66 00 00 00 2d D5 D6 D7 | LINK STATUS |
| 00 D1 D2 D3 D4 D5 D6 D7 | 10 | 0X66 00 00 00 68 D5 D6 D7 | BROADCAST LINK DOWN MESSAGE |
| C0 C1 C2 C3 C4 C5 C6 C7 | 10 | 0X1E C0 C1 C2 C3 C4 C5 C6 C7 | ALL CONTROLS: IDLES, ERRORS |

FIG.11

FABRIC LINK PHYSICAL CODING SUBLAYER PACKING SCHEME

TECHNICAL FIELD

The present disclosure relates to optimizing transmission efficiency for data encoded at the physical coding sublayer level.

BACKGROUND

In data center environments, rack units may house many server devices, e.g., blade servers. Each server device may be configured to host one or more physical or virtual host devices. The servers in the rack units are connected to, e.g., Top of Rack (ToR) switch devices. The switches, in turn, are connected to other switches via a spine switch or spine fabric. Data in a communication session may be exchanged between host devices (physical and/or virtual) in the same or different rack units. For example, packets of data in the session may be sent from a host device in one rack unit to a host device in another rack unit using network or fabric links.

The packets may be routed between by a first switch coupled to a corresponding spine crossbar and a second switch in the rack unit or another rack unit, or otherwise forwarded out of the first switch, e.g., to a client device or a Storage Area Network (SAN). Data received into the switch may use a parallel data bus. By virtue of this parallel structure, when a packet, e.g., of variable size, does not fill a multiple byte size of the parallel bus used for transmission, then any unfilled data slots are filled with empty idle bytes, thereby potentially wasting data transmission bandwidth.

BRIEF DESCRIPTION OF THE DRAWINGS

FIG. 11 shows example PCS block codes that are modified according to the techniques described herein.

DESCRIPTION OF EXAMPLE EMBODIMENTS

Overview

The techniques described herein allow for efficient data packing under certain coding schemes, e.g., when a 64/66 encoding scheme is employed. The traditional 64/66 encoding scheme uses idle bytes to pad packets to obtain a packet of fixed size, thereby adding idle overhead to transmitted packets. The techniques described herein eliminate padding bytes by using, e.g., a modified 64/66 encoding scheme, and provide for receiving packets comprising a plurality of data segments over a first data link at forwarding device, where the data segments of the packets are padded to achieve a predetermined packet length. The padding is removed from the received packets to obtain unpadded packets. Data segments of the unpadded packets are concatenated for forwarding in a continuous data stream with a packet delimiter separating each of the unpadded packets. The continuous data stream is encoded for forwarding over a second data link.

Example Embodiments

Figure 1:
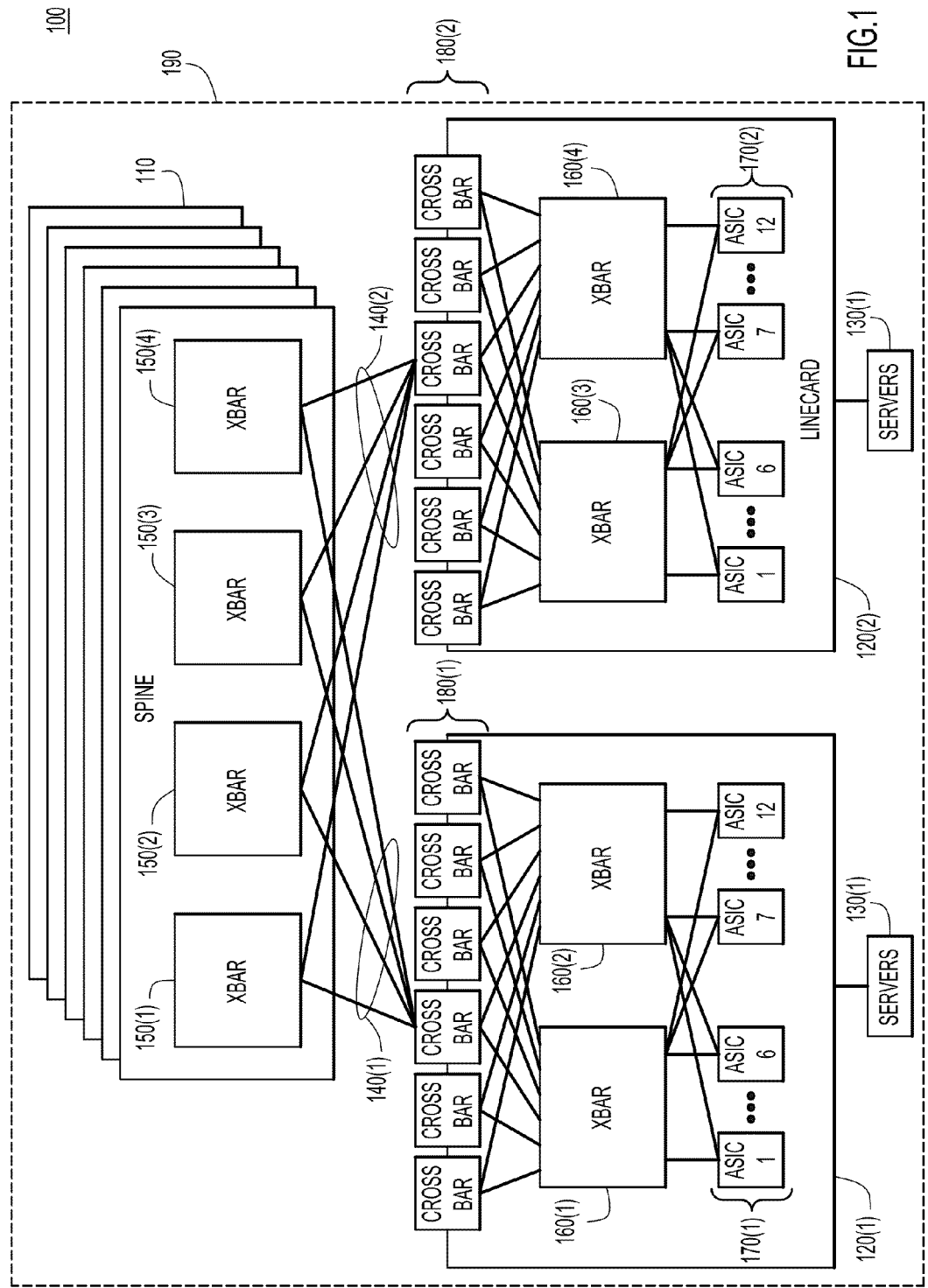
FIG. 1 shows an example network environment including a plurality of servers and switches that form a switch fabric.

The techniques described herein relate to optimizing a physical coding sublayer (PCS) of a network link. An example network environment (e.g., "network") 100 is illustrated in FIG. 1. FIG. 1 shows a plurality of configurable connecting spines 110, a pair of lines cards 120(1) and 120(2), and a plurality of servers 130(1) and 130(2) coupled to lines cards 120(1) and 120(2), respectively. To communicate with each other, a plurality of fabric links, shown collectively at reference numerals 140(1) and 140(2), are provided. The spines 110 and line cards 120(1) and 120(2) are part of single hardware chassis 190. The servers 130 may be part of or separate from chassis 190. The number and types of hardware devices shown in FIG. 1 may vary depending upon the environment, e.g., variations in a network or a data center environment.

Both the spines 110 and the line cards 120(1) and 120(2) employ crossbar (XBAR) switches 150(1)-150(4) and 160(1)-160(4), respectively. The line cards 120(1) and 120(2) include a plurality of front end and other application specific integrated circuits (ASICs) 170(1) and 170(2), and physical (PHY) layer devices 180(1) and 180(2) for transmission and reception over links 140(1) and 140(2). Although not shown, spines 110 may employ ASICs or other processors, and PHY devices. The PHY devices 180 and the spines 110 communicate by way of a backplane in the chassis 190 housing them both. The chassis 190 provides the electrical traces or wiring for the physical connections. The physical characteristics of line cards 120 are described in additional detail in connection with FIGS. 4A and 4B.

To achieve the benefits of the enhanced or modified PCS scheme described herein, devices on both sides of links 140 in network 100 are equipped with logic to concatenate or pack, deconcatenate or unpack, repack, and/or forward packets. The PCS encoding logic for implementing these packing efficiencies is referred to herein as "repacking process logic" and is described hereinafter with variously levels of detail in connection with the remaining figures. One preliminary example of the packing efficiencies that can be achieved is shown in FIG. 2.

Figure 2:
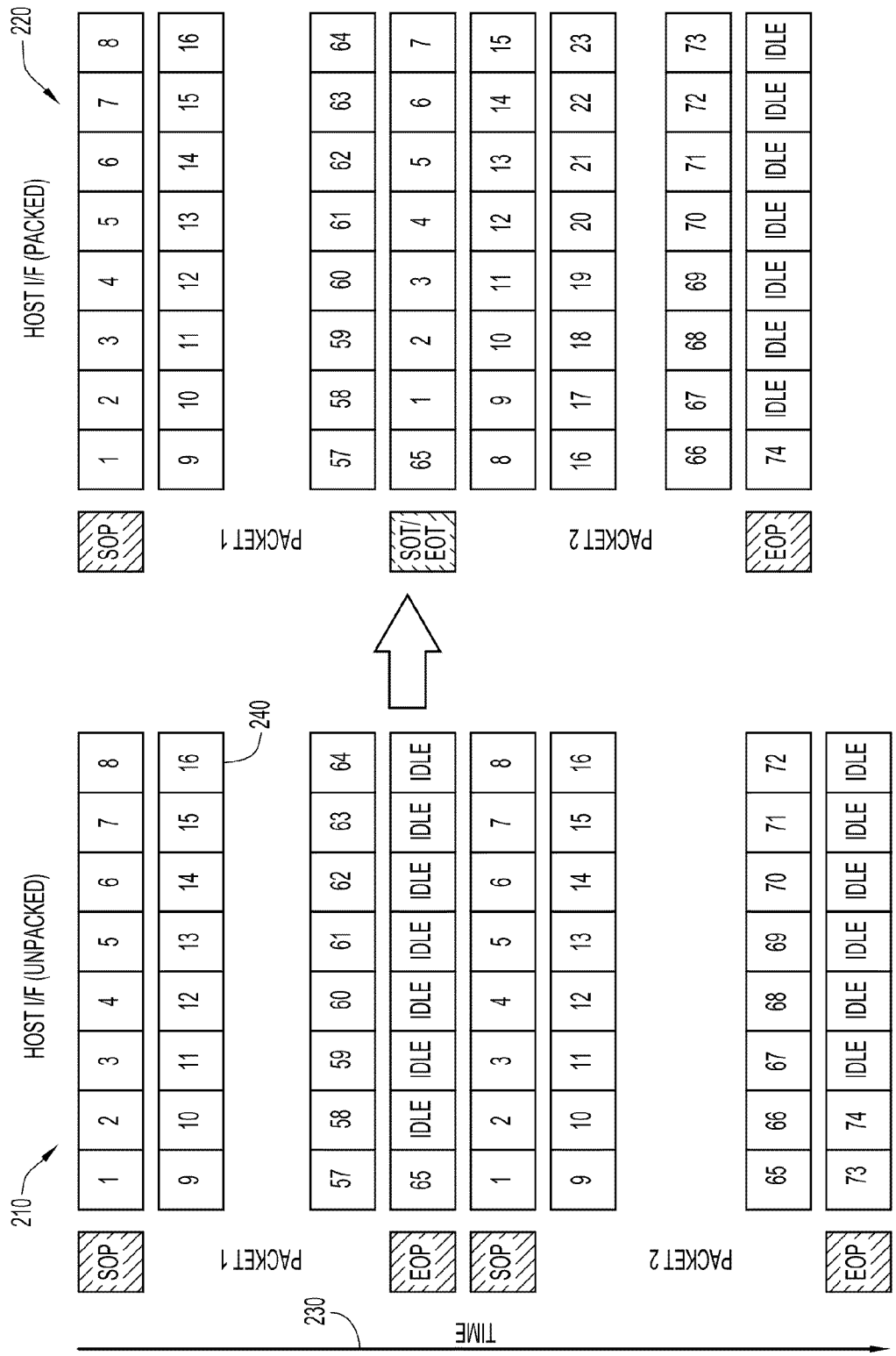
FIG. 2 illustrates how data that has been concatenated according to the techniques described herein provides packing efficiency compared to traditional forwarding techniques.

Referring to FIG. 2, an example data packing scheme is described that illustrates how data can be concatenated according to the techniques described herein when compared to traditional PCS encoding techniques. The 64/66 PCS encoding scheme uses 66 bits to transmit 64 bits or eight bytes of data. The two extra bits in excess of 64 are used to signal whether the 64 bits are all data or control information that may include data. Each block, e.g., rectangle or block 240, shown in FIG. 2 contains text that indicates a byte position number, control information, or whether or not the byte is an "IDLE" byte. A timeline 230 is provided that indicates the passage of time from the top of the figure to the bottom of the figure.

For example, the unpacked data at 210 shows packet 1 and packet 2 for consecutive transmission across links 140. Packet 1 has 65 bytes while packet 2 has 74 bytes. The packet sizes are determined by the packet's source or by other system parameters. As shown in FIG. 2, the blocks are depicted in eight byte segments, e.g., 1 to 8, 9 to 16, etc. Packets are delimited by start of packet (SOP) and end of packet (EOP) markers. The eight byte segments correspond to the 64 bits used for 64/66 PCS encoding, i.e., 8 bytes multiplied by 8 bits per byte equals 64 total bits. When 64/66 PCS encoding is used, for bytes that are not occupied with information, idle bytes are used to fill any remaining slots in the eight byte segment when received over a parallel data bus. The packets 210 are packed according to the repacking process described herein.

Packets that are packed according to the techniques described herein are shown at 220. In this example, packets 1 and 2 are packed into a continuous stream by removing idle packets from packet 1. As shown at 220, idle packets in byte positions 66-72 in packet 1 are removed and concatenated in continuous fashion to form the stream at 220, i.e., byte 1 of packet 2 is now adjacent to packet 65 of packet 1. Packets may be concatenated indefinitely until input data are temporarily stopped, in waiting, or otherwise terminated. A new concatenated stream may begin with a new data stream or control transmission. When the final packet of a continuously concatenated stream terminates, the last remaining bytes in the transmission may be terminated with idle bytes, as shown at the end of packet 2 of stream 220. In this example, bytes or data segment are shown concatenated in series from one packet to the next. In other examples, other data segment sizes may be used, e.g., data words, or other predefined or variable data segment size.

In this manner, both streams 210 and 220 are in a form that represents data receive in parallel fashion and transmitted on a bus of fixed width, e.g., a 64 or 128 line data bus that can support 64 bits (eight bytes) or 128 bits (sixteen bytes) transmitted at a time in a parallel fashion. Accordingly, traditional transmission techniques have been developed to provide packets of a predetermined size. In the examples provide herein, packets are multiples of eight bytes. Thus, when a packet forms an uneven multiple of bus size or does not fill a complete transmission segment, idle or empty bytes are used to fill or "pad" in any transmission gaps, e.g., the idle bytes inserted for packets 1 and 2 as shown at 210.

Figure 12:
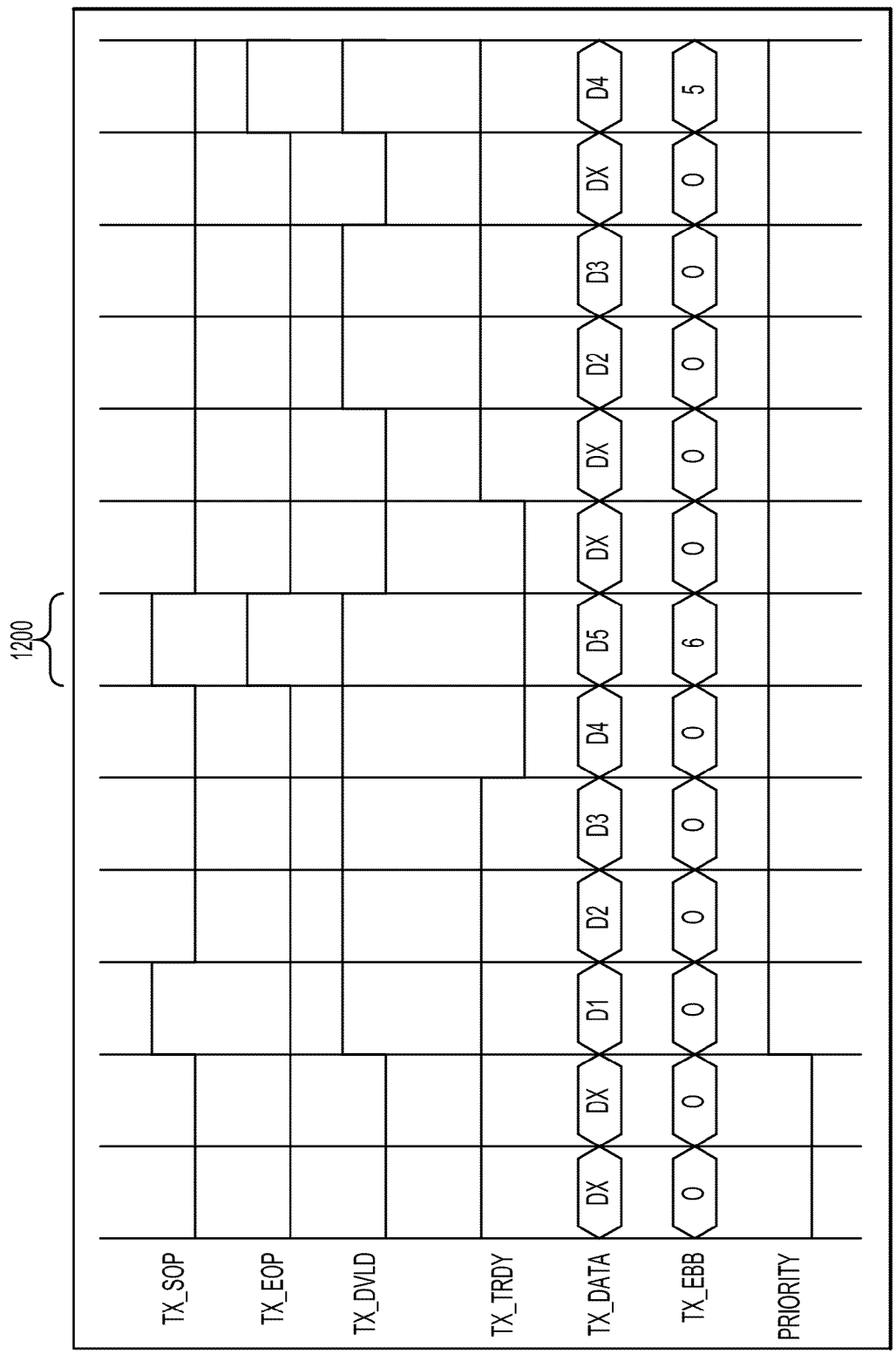
FIG. 12 shows an example physical layer data line timing diagram that uses modified line signaling according to the techniques described herein.

To further facilitate the concatenation techniques, a modified physical layer transmission scheme is employed, e.g., using variations of typical bus signaling as modified and shown in FIGS. 2 and 12. As shown at 220, a start of transmission (SOT)/end of transmission (EOT) signal is simultaneously asserted between packet 1 and packet 2 to indicate further information is present in the contiguous stream as described in connection with FIG. 5.

Figure 3:
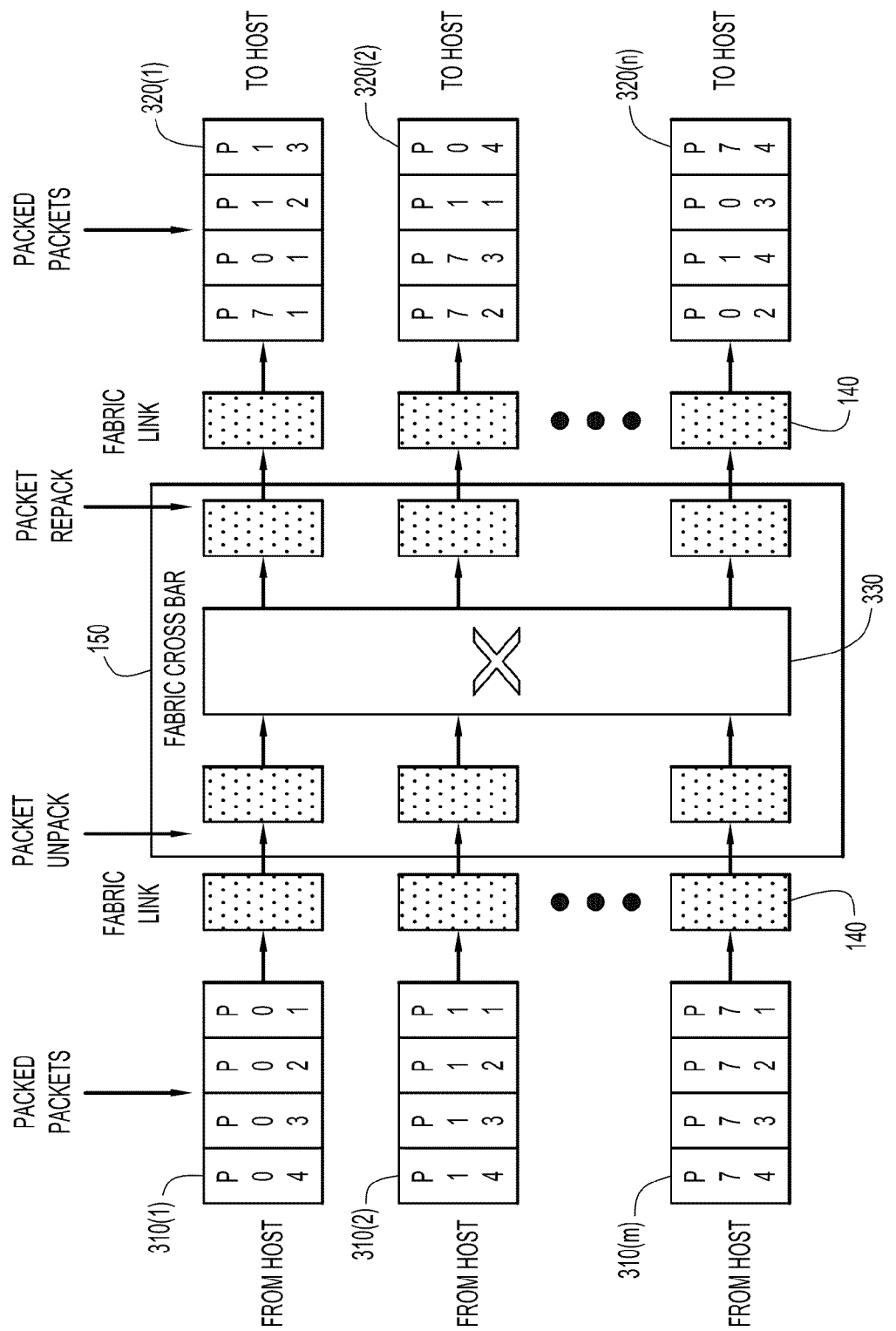
FIG. 3 is an example block diagram of a fabric crossbar configured to concatenate packets according to the techniques described herein.

Reference is now made to FIG. 3. FIG. 3 shows an example of XBAR 150, e.g., that is one of switch fabric XBARs 150 or XBARs 160 shown in FIG. 1 and includes a hardware switching matrix 330. For this example, it can be assumed that XBAR 150 is between line cards 120 for the purpose of routing host data 310 to destination data streams 320. A series of packet streams 310(1) through 310(m) are received from m hosts. A "host" in this context means a software/firmware module or a device that is a source of a packet, e.g., a server, and may also refer to the packet's destination environment, e.g., another server, user client's computer, a storage device, or potentially another switching module or XBAR for further forwarding. The packet streams 310 have been concatenated or packed according to the techniques described herein, i.e., with all padding or idle packets removed to form the contiguous or semi-contiguous data or packet streams 310.

As the streams 310 are received, they are unpacked into individual packets addressed for routing to their individual destinations using streams 320(1)-320(n). Fabric crossbar 150 routes the packets through switching matrix 330 using internal logic that incorporates some form of the repacking process logic. For example, the streams 310 may originate by way of line card 120(1), other line card, or via a line card front panel port. The packets in the streams 310 are unpacked, separated, rerouted and repacked by XBAR 150 and repacked or concatenated into streams 320, and subsequently forwarded, e.g., by way of links associated with one of spines 110. As can be seen from the rerouting and as viewed in FIG. 3, the numbered packets in streams 310(m) have moved to various destination streams 320(n). The number of input streams, m, does not necessarily correspond to the number of output streams, n.

Figure 4A:
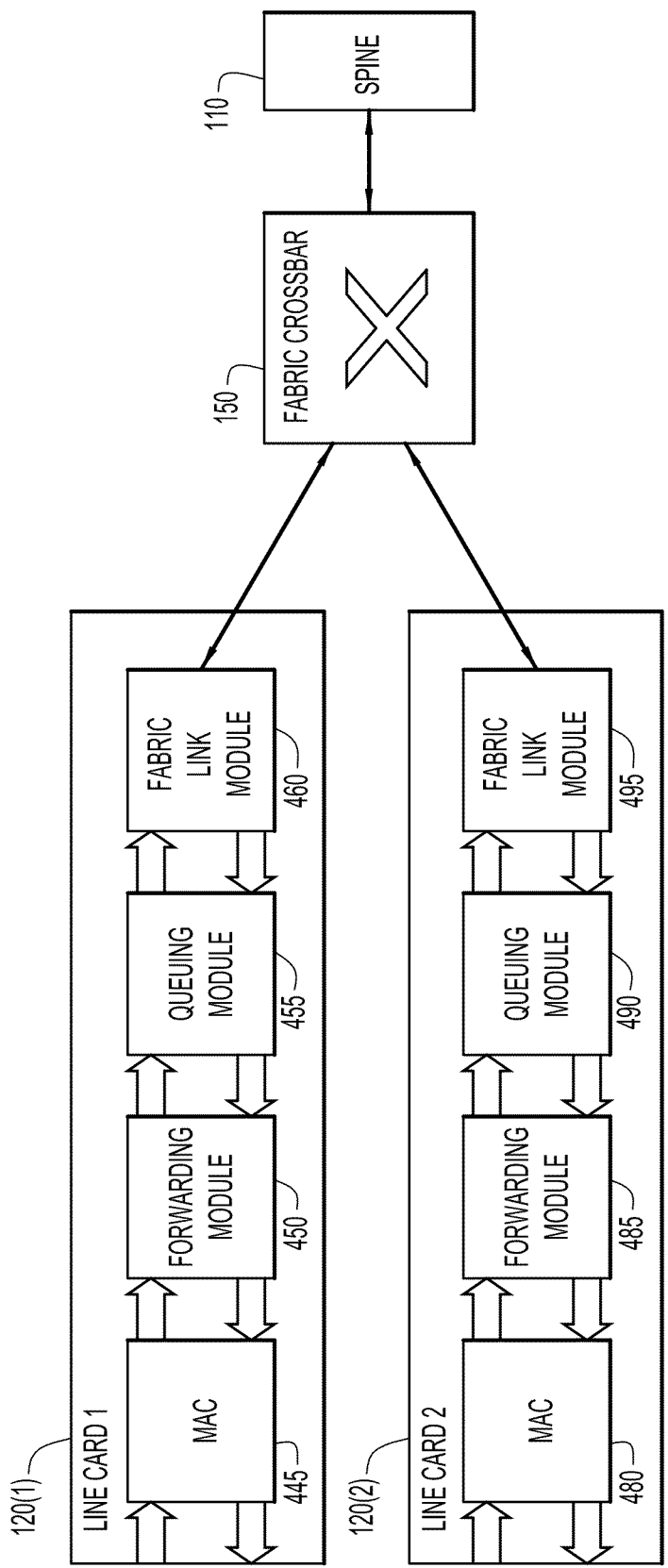
FIGS. 4A and 4B show an example block diagrams line card switches coupled to a crossbar and a configurable spine, and a generic block diagram of one of the switch devices on a line card or crossbar device configured according to the techniques described herein.
Figure 4B:
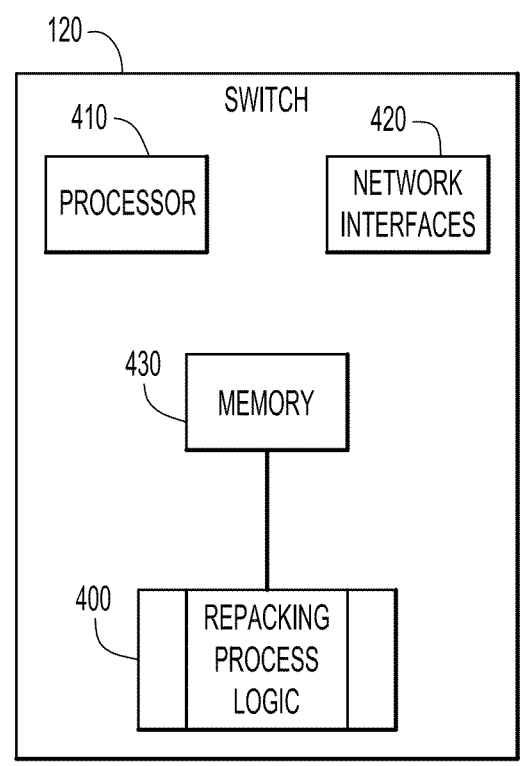

Turning now to FIGS. 4A and 4B, an example block diagrams of a switch device, e.g., a line card is depicted in detail as functional components, and may be applied to XBARs on both sides of fabric links 140 (FIG. 1). The line cards are configured to pack a continuous data streams by concatenating packets without padding according to the repacking process. Complementary process logic in incorporated on the spine side of links 140 such that line card-to-line card, or switch-to-switch data concatenation efficiencies may be obtained through the use of the techniques described herein.

FIG. 4A depicts line cards 120(1) and 120(2), one of XBARs 150, and spine 110 from FIG. 1. Line card 120(1) has a MAC interface 445 for interfacing with the line card's front panel, a forwarding module 450 that provides addressing, a queuing module 455, and fabric link module 460. Similarly, line card 120(2) has a MAC interface 480 for interfacing with the line card's front panel, a forwarding module 485 that provides addressing, a queuing module 490, and fabric link module 495. The repacking process logic is incorporated in fabric link modules 460 and 495, and corresponding fabric crossbar 150.

For simplicity, the switch device in FIG. 4B is shown at reference numeral 120 for a line card, although it should be appreciated that the switch device 120 may be any of the switch or XBAR devices in the network 100. The switch device 120 comprises, among other components, a plurality of network ports or interfaces 420 that may service both front plane and/or back plane connectivity, a processor 410 that may include one or more switch ASICs, and a memory 430. The line card 120 incorporates repacking process logic 400 for packing, unpacking, and/or repacking of packets according to the techniques described herein. Process 400 may be shared among hardware components, e.g., processor 410 and any associated ASICs, as well as network interfaces or ports 420.

The ports 420 are configured to receive communications (e.g., packets) from devices in the network 100 and to send communications to devices in the network 100. For example, the ports 420 may be configured to send/receive data packets to/from the servers 130, or between line cards 120 and spine switches 110. The ports may be coupled to the switch ASICs included or separate from processor 410. Switch ASICs enable packets received by the switch device 120 to be forwarded to the appropriate device in the network 100. For example, when the switch device 120 receives a packet at a first port, the switch 120 determines a second port on which the packet should be forwarded in the network. That is, if a packet is received at the first port from one of servers 130(1), the switch may determine to forward the packet to the second port 180, which services one of spine switches 110, for ultimate forwarding to one of servers 130(2) or other destination.

The processor 410 is, for example, a microprocessor or microcontroller that is configured to execute program logic instructions (i.e., software) for carrying out various operations and tasks of the switch device 120, as described herein. For example, the processor 410 is configured to execute repacking process logic 400 to eliminate bandwidth that is wasted. The memory unit 430 is configured to store information associated with subnet routes, host routes and default routes of received packets. The functions of the processor 410 may be implemented by logic encoded in one or more tangible computer readable storage media or devices (e.g., storage devices, compact discs, digital video discs, flash memory drives, etc. and embedded logic such as an ASIC, digital signal processor instructions, software that is executed by a processor, etc.).

The memory 430 may comprise read only memory (ROM), random access memory (RAM), magnetic disk storage media devices, optical storage media devices, flash memory devices, electrical, optical, or other physical/tangible (non-transitory) memory storage devices. The memory 430 stores software instructions for the repacking process logic 400. Thus, in general, memory 430 may comprise one or more computer readable storage media (e.g., a memory storage device) encoded with software comprising computer executable instructions and when the software is executed (e.g., by the processor 410), it is operable to perform the operations described herein for the repacking process logic 400.

The repacking process logic 400 may take any of a variety of forms, so as to be encoded in one or more tangible computer readable memory media or storage devices for execution, such as fixed logic or programmable logic (e.g., software/computer instructions executed by a processor). In one example, the repacking process logic 400 may be stored in a memory component of the spines 110. The processor 410 may be an ASIC that comprises fixed digital logic, or a combination thereof, as described above.

For example, the processor 410 may be embodied by digital logic gates in a fixed or programmable digital logic integrated circuit, which digital logic gates are configured to perform the repacking process logic 400. In general, the repacking process logic 400 may be embodied in one or more computer readable storage media encoded with software comprising computer executable instructions and when the software is executed operable to perform the operations described herein. It should be understood that process logic 400 is performed by devices at either end of a data link, e.g., a fabric link. The devices at either end of the link may include XBARs or other switches, and their associated support hardware and/or software.

Figure 5:
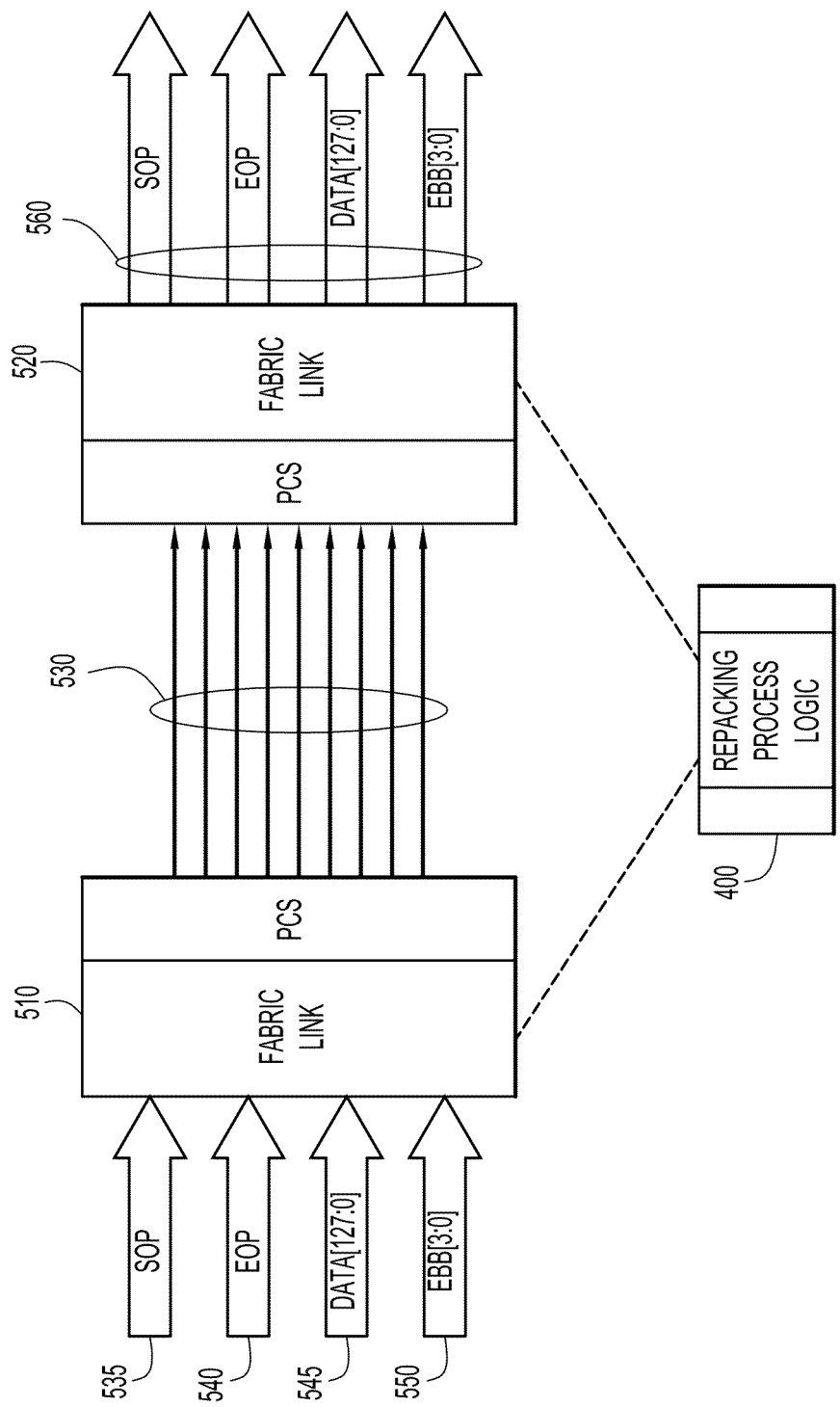
FIG. 5 shows an example block diagram of two switch fabric link ports that communicate with each other over a switch backplane.

Reference is now made to FIG. 5. FIG. 5 shows an example block diagram of two switch fabric link ports that communicate with each other over a switch backplane. FIG. 5 shows a transmit link port 510 and a receive link 520. The links communicate using serialized data over, e.g., eight Serializer/Deserializer (SerDes) lines 530 of a backplane data bus. The number of traces shown for bus 530 is not necessarily to scale. The number of line traces 530 may be based on design considerations.

As viewed on the left side of FIG. 5, a number of inputs are provided to link 510. In this example, an SOP signal 535, an EOP signal 540, 128 bits of data 545 [127:0], and an end-of-byte boundary signal 550 are inputs to link 510 in a parallel bus fashion. The SOP 535 and EOP 540 are line signals that are asserted for link 510 at the beginning and end of a packet transmission, have been modified according to the techniques described herein, and are further illustrated in FIG. 12. The data 545 are processed using repacking process logic 400 for PCS encoding as indicated for link 510. The inputs to link 510 are ultimately converted to serial form for transmission over bus 530. The parallel to serial conversion may be performed by, e.g., a Serializer/Deserializer (SerDes) semiconductor chip. On the receive side, at link 520, a SerDes chip converts the data back to original parallel form as shown collectively at 560.

Figure 6:
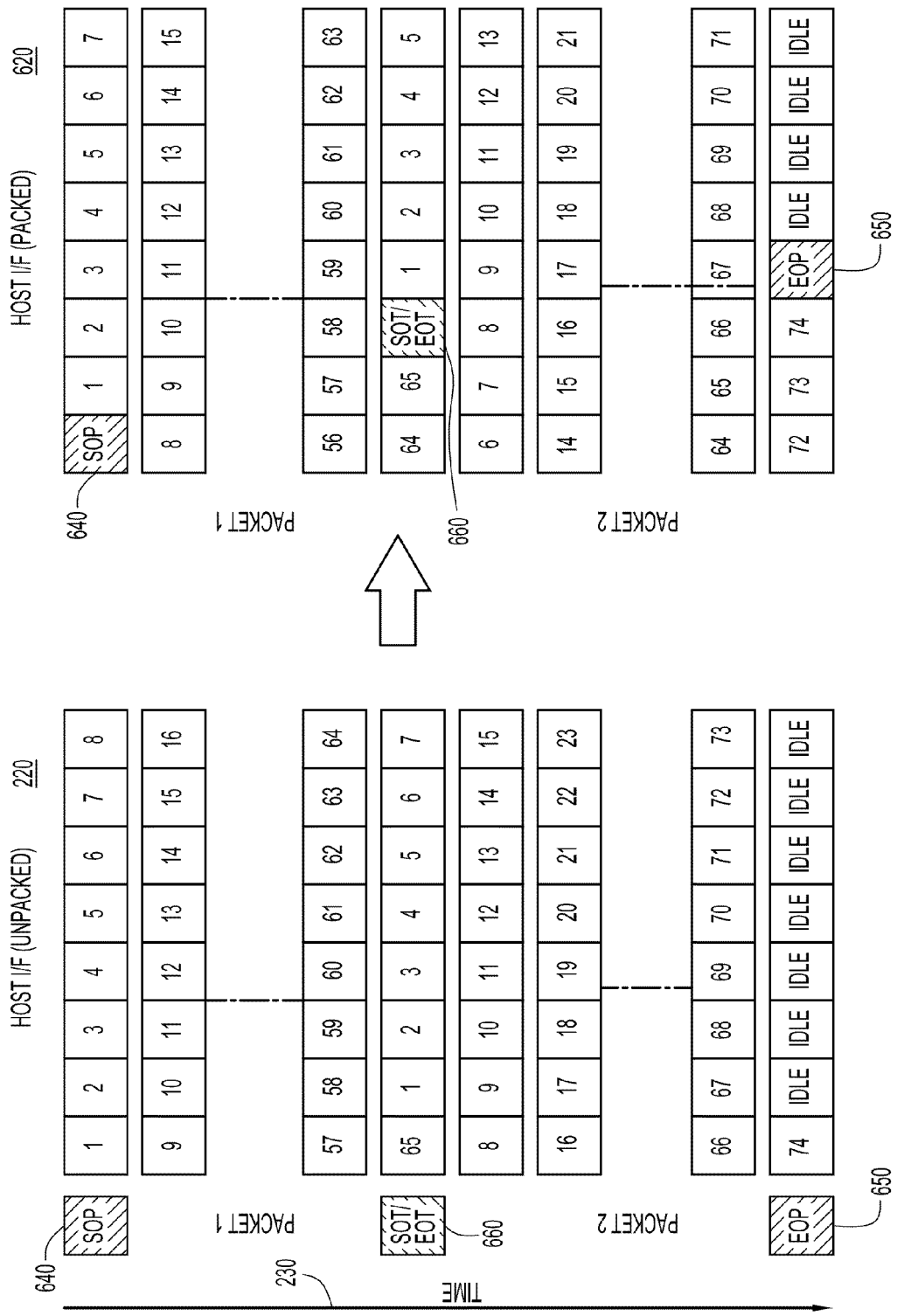
FIG. 6 shows an example data flow of a first stage that adds data delimiters according to the techniques described herein.

Turning to FIG. 6, the data packing scheme described in connection with FIG. 2 is further described. The packed data 220 from FIG. 2 is shown on the left hand side of the figure. The timeline 230 is maintained from FIG. 2 and indicates the passage of time from the top of the figure to the bottom of the figure. The packets are delimited by SOP 640 and EOP 650 markers that would normally be placed at the start and end of each packet. However, according to the techniques described herein, the SOP 640 and EOP 650 are placed at the beginning and the end of a continuous or contiguous stream of packets. Accordingly, a stream of packets may be transmitted continuously and without limit to the streams length. The length of the data stream is limited only by whether or not data is available for transmission.

To facilitate the detection of packet boundaries, an SOT/EOT signal 660 indicates that the SOP and EOP line signals are simultaneously asserted, e.g., at the input to transmit link 510 shown in FIG. 5. The simultaneous assertion of SOP and EOT allows the addition of previously undefined PCS delimiters that are shown in FIG. 11. The data stream with the SOP 640, EOP 650, and SOT/EOT 660 delimiters inserted into the data stream is shown at 620. Data stream 620 is queued for PCS encoding and transmission, e.g., by transmit link 510. Note that the line signals and other transmission characteristics are shown on FIG. 12 and described hereinafter. Thus, various signal can be asserted on the various control lines, e.g., one or more of a start of packet signal, end of packet signal, and simultaneously asserting a start of packet signal and end of packet signal at the packet delimiters may be asserted prior to encoding the continuous data stream.

Figure 7:
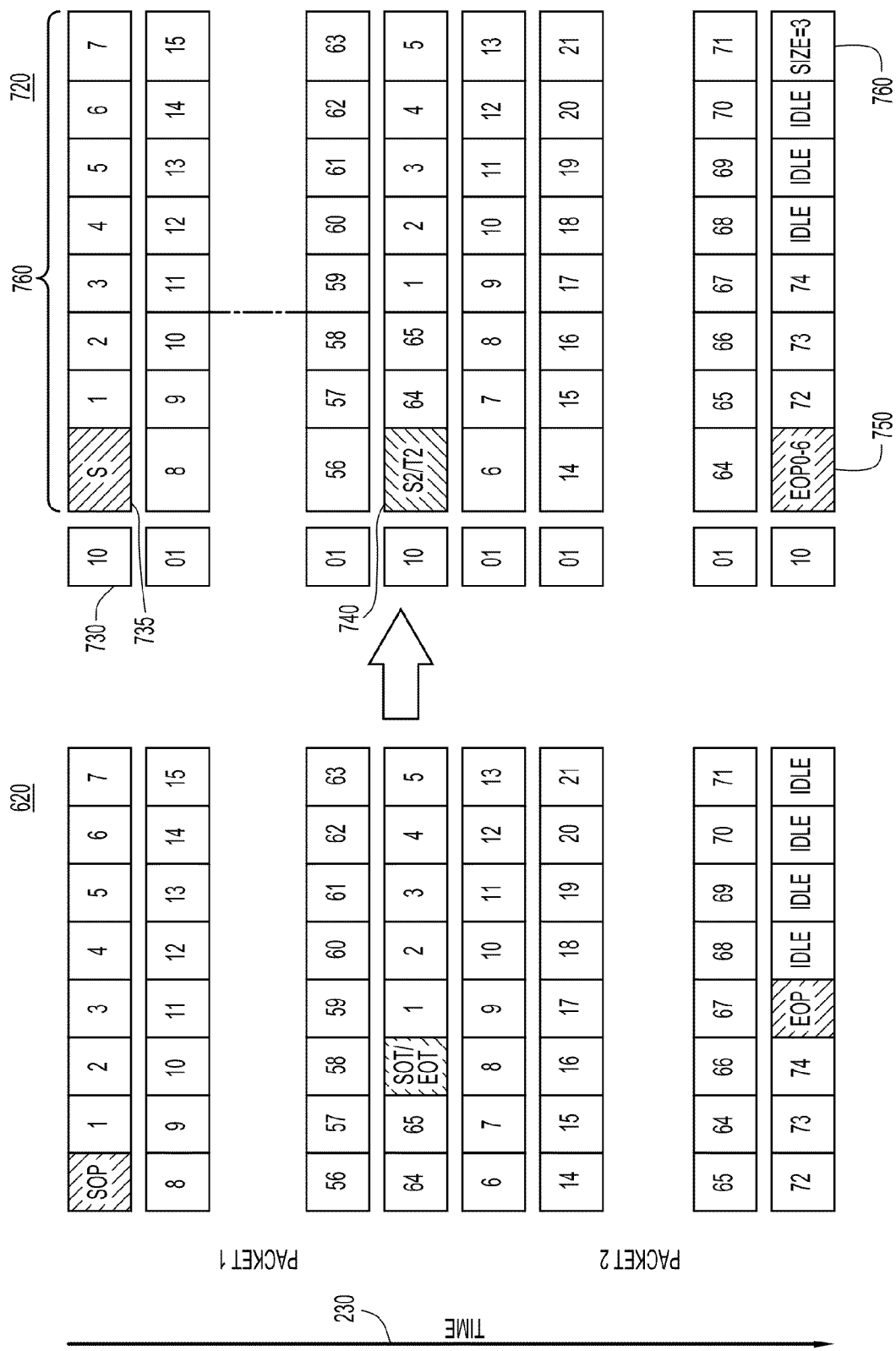
FIG. 7 shows the example of a second stage of the data flow from FIG. 6 that is physical coding sublayer (PCS) encoded.

Turning to FIG. 7, the PCS encoding process implemented by repacking process logic 400 is further described as a continuation of process 400 described in connection with FIG. 6. The data stream 620 with added delimiters becomes the input to the PCS encoder, e.g., ASICs that are part of processor 410 (FIG. 4), and is depicted on the left hand side of FIG. 7. Timeline 230 is retained.

The output of the PCS encoder is shown at 720. The output of the decoder 720 is 66 bits generated from the original 64 bits, i.e., 8 bytes. The output of the PCS encoder includes a two bit synchronization (sync) header (hdr) 730, and encoded data and control information 760. The sync header 730 has two possible values. As shown in FIG. 7 the sync header 730 has bit values of "10" or "01" binary (b). The sync header 01b indicates that the 8 byte block is all data, while the 10b sync header indicates that a combination of block type and/or data is contained within the 8 byte transmission block. In this example, block types 735, 740, and 750 become "known" to the receive link, e.g., link 520 (FIG. 5) by way of 10b sync header notifications.

Sync header 735 "S" indicates a block type start or SOP. Sync header 740 "S2/T2" indicates a next packet start and a previous packet terminate two bytes after the block type signal byte. As shown in FIG. 7 bytes 64 and 65 from packet 1 continue for two bytes after the block type 740 signal and packet 2 starts two bytes after the block type 740 signal. Sync header 750 "EOP0-6" indicates that an EOP occurs in one of the next 6 bytes and the EOP is "pointed to" by the size, e.g., size 3 shown at 760. Although a one byte block type indicates 256 possible values, in reality, only 15 possible values are allowed for PCS encoding in order to maintain direct current (DC) balance during physical transmission and Hamming distance. In information theory, the Hamming distance between two strings of equal length is the number of positions at which the corresponding symbols are different. In other words, the Hamming distance measures the minimum number of bit substitutions required to change one string into the other, or the minimum number of errors that could have transformed one string into the other.

Since the packets are concatenated into a continuous stream using the techniques described herein, the standard packet delimiters, e.g., "S2/T2," "S3/T3," etc., are already used to delimit packets. Accordingly, a new delimiter is needed for the last packet in the continuous transmission when it becomes time to terminate the stream and the packet does not fill a complete 8 byte block. As shown in FIG. 11, when data occupy a complete block, i.e., through byte 7, a block code (EOP-7) of 0x33 (hex) is used to indicate the last packet ends at byte 7. However, when the last packet occupies a position lower than byte 8, a block code of 0x2D is used. The 0x2D block code indicates that the last EOP is in the byte position indicated by the "size" delimiter, which is stored in byte 7. As shown in FIG. 7, size 760 indicates a size of 3 which indicates that the EOP occurs 3 bytes after the block type code 750. Block type codes modified according to the techniques described herein are summarized as shown in FIG. 11.

Figure 8:
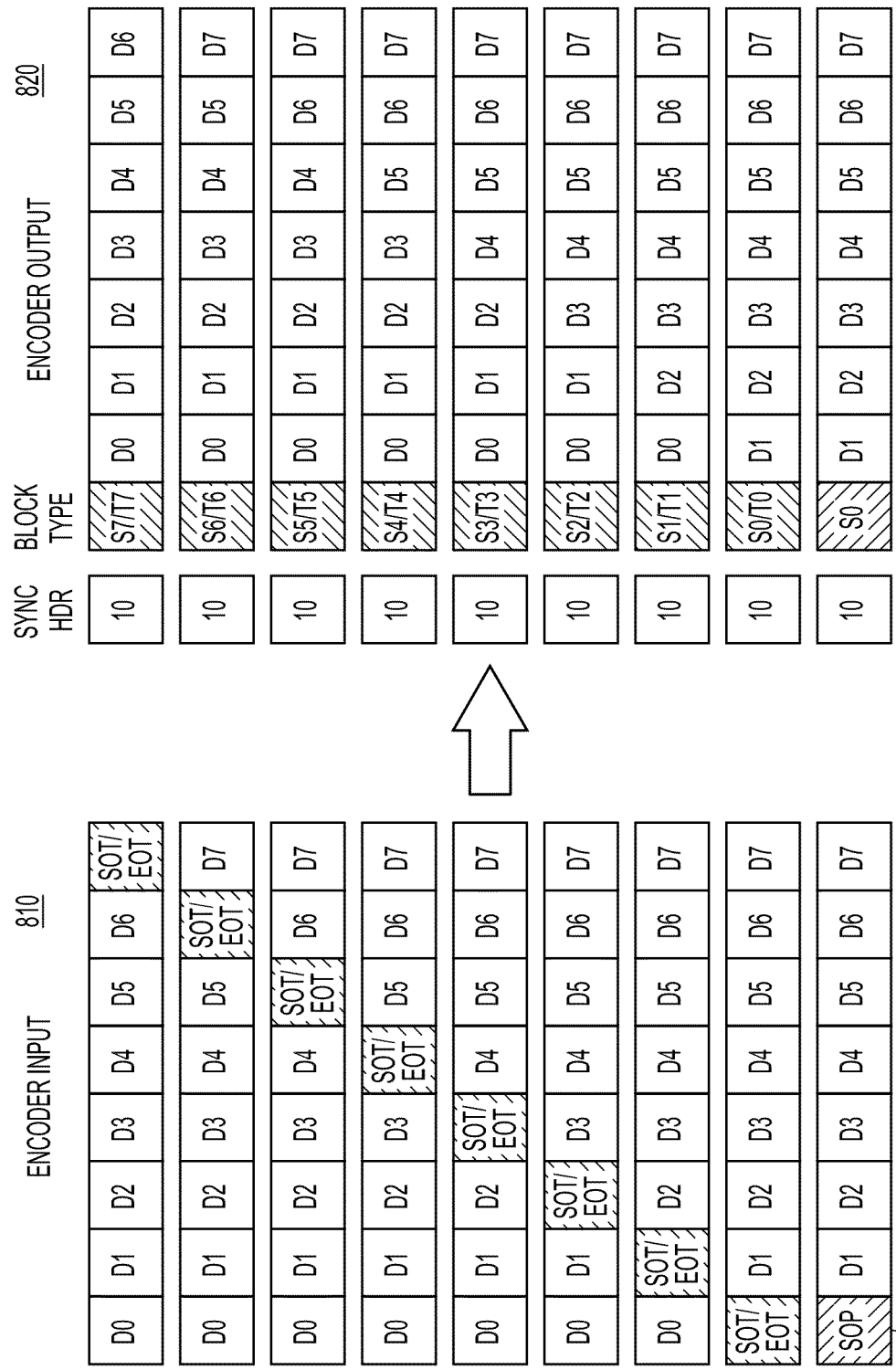
FIGS. 8 and 9 are simplified encoder input/encoder output diagrams for continuous data streams and non-continuous data stream, respectively.
Figure 9:
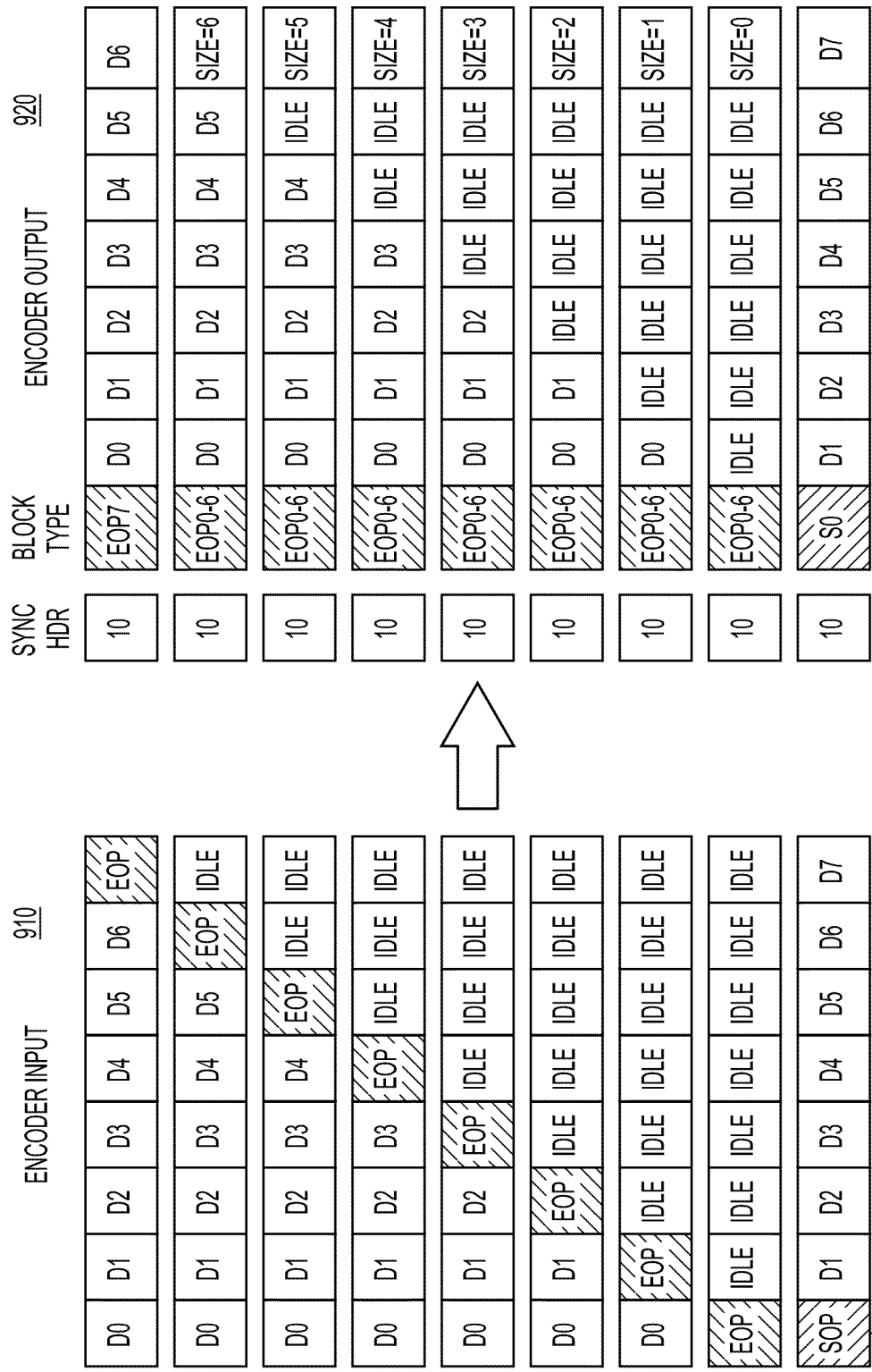

FIGS. 8 and 9 are simplified encoder input/encoder output diagrams for continuous data streams and non-continuous data stream, respectively. Referring to FIG. 8, at 810, a series of variable length data segments are shown as an input into a PCS encoder and are labeled as D0, D1, D2, etc., to indicate byte position along with SOT/EOT packet delimiters. Note that when SOP and EOP are asserted simultaneously a packet delimiter is signaled at 1200 (FIG. 12) that indicates the end of one packet and the beginning of another.

As shown in FIG. 8, the encoder output 820 uses a sync header of 10b for all blocks which indicates that the first byte in the block has control information. In this example, S5/T5 indicates the end of a packet in byte five and start of packet at byte six, S6/T6 indicates the end of packet at byte six and start of packet at byte seven, etc., and in this example, decremented by one until S0/T0 is reached. A block type of S0 indicates the start of a new packet in byte position zero.

FIG. 9 shows simplified encoder input/encoder output diagrams for a non-continuous data stream. The encoder input 910 shows a series of packets occupying various byte positions in terms of a PCS data line. Each packet is followed by idle data blocks. The end of each packet in the data stream 910 is delimited by an EOP. The EOP is encoded with a sync header of 10b and a block code EOP7 for the first packet followed by partial packet block codes EOP0-6 and the associated sized value as shown by encoder output 920. The last packet is full and begins at the start of the block and the SOP block code 930 is asserted.

Figure 10:
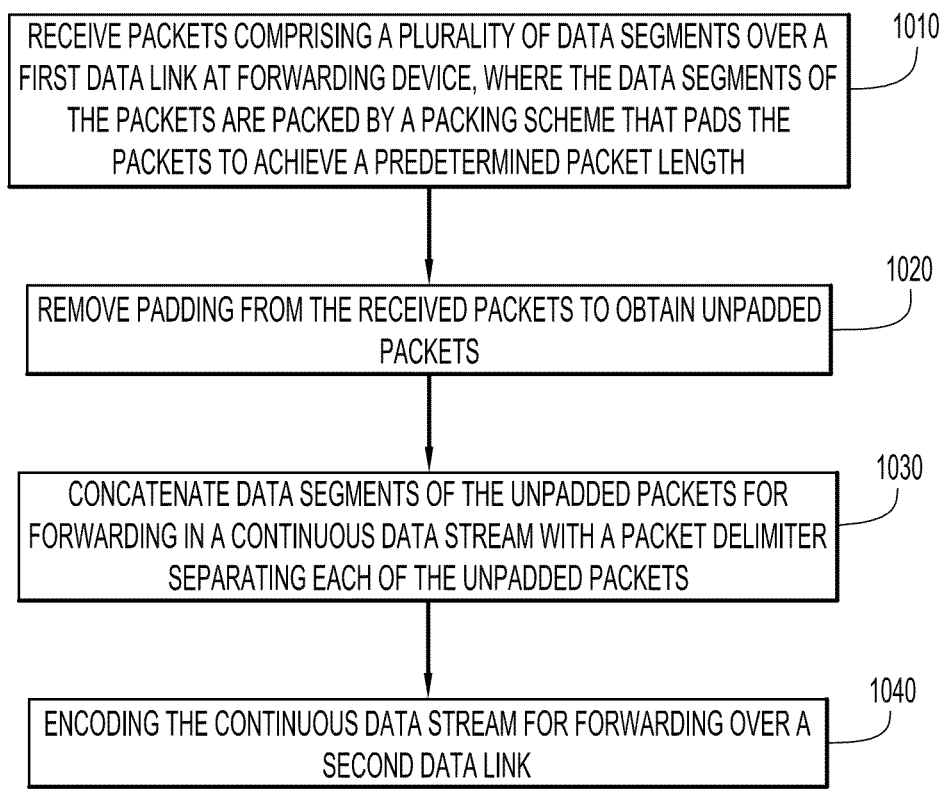
FIG. 10 is an example flow chart depicting a general process for packing or concatenating packets to be PCS encoded.

Reference is now made to FIG. 10, which shows an example flow chart that generally describes repacking process logic 400. At 1010, packets are received that comprise a plurality of data segments over a first data link, e.g., a fabric link, at a forwarding device, where the data segments of the packets are packed by a packing scheme that pads the packets to achieve a predetermined packet length. At 1020, the padding is removed from the received packets to obtain unpadded packets. At 1030, data segments of the unpadded packets are concatenated for forwarding in a continuous data stream with a packet delimiter separating each of the unpadded packets. At 1040, the continuous data stream is encoded, e.g., using the modified PCS encoding scheme, and forwarded over a second data link.

Thus, the techniques described herein provide an efficient transmission scheme that uses a modified PCS encoding scheme. The modified PCS encoding scheme as used herein and in the claims indicates the variations in standard PCS encoding as described herein.

It should be appreciated that the techniques described above in connection with all embodiments may be performed by one or more computer readable storage media that is encoded with software comprising computer executable instructions to perform the methods and steps described herein. For example, the operations performed by one or more of the fabric link processors may be performed by one or more computer or machine readable storage media (non-transitory) or device executed by a processor and comprising software, hardware or a combination of software and hardware to perform the techniques described herein.

The above description is intended by way of example only. Various modifications and structural changes may be made therein without departing from the scope of the concepts described herein and within the scope and range of equivalents of the claims.

What is claimed is:

1. A method comprising:
receiving packets comprising a plurality of data segments over a first data link at a forwarding device, wherein the data segments of the packets are padded to achieve a predetermined packet length;
removing padding from the received packets to obtain unpadded packets;
concatenating data segments of the unpadded packets for forwarding in a continuous data stream with a packet delimiter separating each of the unpadded packets;
encoding the data segments of the continuous data stream for forwarding over a second data link, wherein the encoding includes encoding delimiters into the continuous data stream, wherein a first byte of each encoded data segment contains a block code, and wherein the block code indicates at least one of a start of packet, an end of packet, a start of packet stream, an end of packet stream, and an end of packet stream with an end of packet pointer; and
when the continuous data stream ends prior to an end of a given data segment, adding a size indicator at the end of the given data segment indicating a number of packets present in the given data segment.

2. The method of claim 1, further comprising:
receiving an encoded continuous data stream with encoded delimiters;
analyzing the encoded delimiters to recover individual packets; and
forwarding the individual packets.

3. The method of claim 1, wherein encoding comprises encoding at the physical coding sublayer.

4. The method of claim 1, wherein encoding comprises encoding using a modified 64b/66b physical coding sublayer scheme.

5. The method of claim 1, further comprising asserting one or more of a start of packet signal, end of packet signal, and simultaneously asserting a start of packet signal and end of packet signal at the packet delimiters prior to encoding the continuous data stream.

6. The method of claim 1, wherein a data segment comprises a plurality of bytes, a plurality of words, or a variable length packet.

7. The method of claim 1, wherein the first and second data links comprise fabric links and the forwarding device comprises one of a crossbar switch and a switch.

8. An apparatus comprising:
a plurality of network ports;
a switch unit coupled to the plurality of network ports;
a memory; and
a processor coupled to the switch unit and the memory, and configured to:
receive packets comprising a plurality of data segments over a first data link at a forwarding device, wherein the data segments of the packets are packed by a packing scheme that pads the packets to achieve a predetermined packet length;
remove padding from the received packets to obtain unpadded packets;
concatenate data segments of the unpadded packets for forwarding in a continuous data stream with a packet delimiter separating each of the unpadded packets;
encode the data segments of the continuous data stream for forwarding over a second data link, wherein when the processor encodes the data segments the processor encodes delimiters into the continuous data stream, wherein a first byte of each encoded data segment contains a block code, and wherein the block code indicates at least one of a start of packet, an end of packet, a start of packet stream, an end of packet stream, and an end of packet stream with an end of packet pointer; and
when the continuous data stream ends prior to an end of a given data segment, add a size indicator at the end of the given data segment indicating a number of packets present in the given data segment.

9. The apparatus of claim 8, wherein the processor is further configured to:
receive an encoded continuous data stream with encoded delimiters;
analyze the encoded delimiters to recover individual packets; and
forward the individual packets.

10. The apparatus of claim 8, wherein the network ports comprise fabric link ports.

11. The apparatus of claim 8, wherein the processor is configured to encode at the physical coding sublayer.

12. The apparatus of claim 8, wherein the processor is configured to encode using a modified 64b/66b physical coding sublayer scheme.

13. The apparatus of claim 8, wherein the processor is further configured to assert one or more of a start of packet signal, end of packet signal, and simultaneously asserting a start of packet signal and end of packet signal at the packet delimiters prior to encoding the continuous data stream.

14. A non-transitory computer-readable storage media encoded with software comprising computer executable instructions and when the software is executed operable to:
receive packets comprising a plurality of data segments over a first data link at a forwarding device, wherein the data segments of the packets are packed by a packing scheme that pads the packets to achieve a predetermined packet length;
remove padding from the received packets to obtain unpadded packets;
concatenate data segments of the unpadded packets for forwarding in a continuous data stream with a packet delimiter separating each of the unpadded packets;
encode the data segments of the continuous data stream for forwarding over a second data link, wherein when the software is executed to encode the data segments, delimiters are encoded into the continuous data stream, wherein a first byte of each encoded data segment contains a block code, and wherein the block code indicates at least one of a start of packet, an end of packet, a start of packet stream, an end of packet stream, and an end of packet stream with an end of packet pointer; and
when the continuous data stream ends prior to an end of a given data segment, add a size indicator at the end of the given data segment indicating a number of packets present in the given data segment.

15. The non-transitory computer-readable storage media of claim 14, further comprising instructions operable to:
receive an encoded continuous data stream with encoded delimiters;
analyze the encoded delimiters to recover individual packets; and
forward the individual packets.

16. The non-transitory computer-readable storage media of claim 14, wherein the instructions that encode comprise instructions to encode at the physical coding sublayer.

17. The non-transitory computer-readable storage media of claim 14, wherein the instructions that encode comprise instructions to encode using a modified 64b/66b physical coding sublayer scheme.

18. The non-transitory computer-readable storage media of claim 14, further comprising instructions operable to assert one or more of a start of packet signal, end of packet signal, and simultaneously asserting a start of packet signal and end of packet signal at the packet delimiters prior to encoding the continuous data stream.

* * * * *